Feb. 14, 1956     N. G. ANGELO     2,734,764
LATCH FOR A TRUNK LID
Filed Aug. 14, 1952
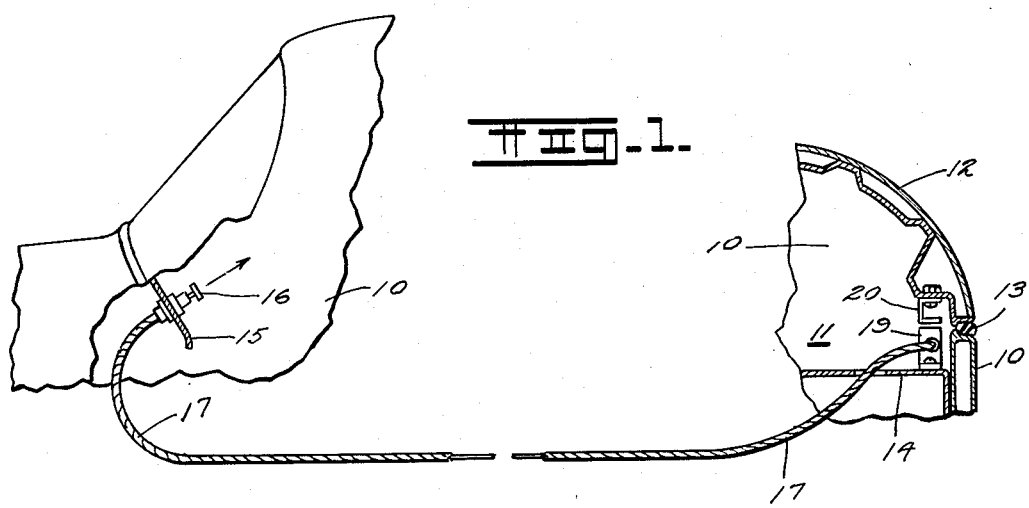
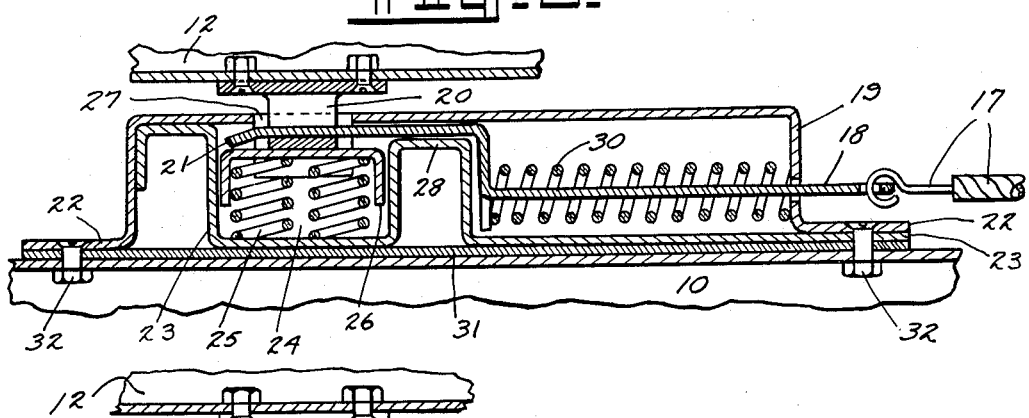
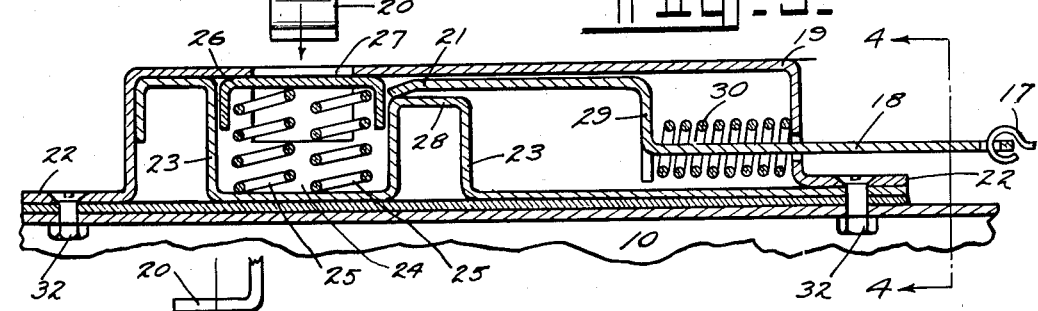
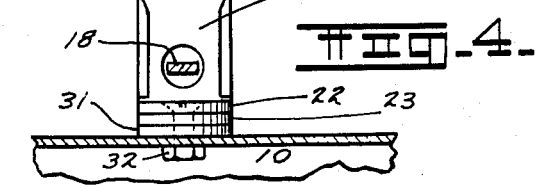
INVENTOR.
Nick G. Angelo.
BY
W. B. Harpman
ATTORNEY.

United States Patent Office 2,734,764
Patented Feb. 14, 1956

2,734,764

LATCH FOR A TRUNK LID

Nick G. Angelo, Youngstown, Ohio

Application August 14, 1952, Serial No. 304,356

1 Claim. (Cl. 292—333)

This invention relates to latches and more particularly to a latch adapted for automatic actuation in holding an automobile trunk lid.

The principal object of the invention is the provision of a simple and efficient automatically actuated latch mechanism for an automobile trunk lid.

A further object of the invention is the provision of a latch mechanism which may be inexpensively formed of a few simple parts.

A still further object of the invention is the provision of a latch that may be readily assembled and easily attached to an automobile structure for its intended purpose.

A still further object of the invention is the provision of a latch incorporating spring pressed parts movable at right angles to one another and arranged for interdependency in latching action depending upon initial movement of one of the parts by an object to be secured thereby.

A still further object of the invention is the provision of a latch for a trunk lid that may be remotely actuated as from the body compartment of an automobile.

The latch for an automobile trunk lid disclosed herein comprises an improvement in the art of latches capable of use on such structures.

It is well known that many and various forms of latches have heretofore been proposed for the purpose, the majority of which have incorporated latch mechanisms attached to the lid and secured with a fixed keeper on the trunk. Such devices ordinarily require manual manipulation in order to be locked and invariably require the use of a key to open the same.

The present disclosure relates to a latch which is inexpensive in formation and may be mounted in the trunk of an automobile in a position where an L-shaped extension on the trunk lid will register therewith and automatically actuate the same. The latch is particularly adapted for remote control as through a flexible cable from the body compartment.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a composite view of portions of an automobile body with parts in section and parts broken away and showing the latch installed therein.

Figure 2 is a vertical section of the latch showing the same in operative relation to a portion of an automobile body or trunk and a trunk lid.

Figure 3 is a vertical section similar to Figure 2 and showing the latch in unlocked position.

Figure 4 is an end view taken on line 4—4 of Figure 3.

By referring to the drawings and Figure 1 in particular it will be seen that an automotive body is generally indicated by the numeral 10 and that it specifically includes a trunk portion 11 which is provided with a hinged lid 12. The lower edge of the lid 12 is adapted to engage a gasket 13 on a flanged portion of the body 10 defining the outer wall of the trunk 11, as known in the art.

A floor member 14 is formed in the trunk as is customary. A dashboard 15 or other suitable portion of the automobile is illustrated and shown provided with a button 16 which is attached to a flexible cable and sheath combination 17, also known in the art. The flexible cable and sheath 17 extends to the trunk 11 and is attached to a latch arm 18 which is part of a latch structure enclosed in a housing 19. The trunk lid 12 has a depending L-shaped bracket 20 thereon adapted to register with a cutaway portion of the housing 19 so as to engage the mechanism of the latch therein and so that in such engagement it may be retained by a forward extension 21 of the latch arm 18.

The housing 19 has outwardly extending end tabs 22—22 and an inner body member 23 having a U-shaped portion which defines a first chamber 24 therein and in which a pair of coil springs 25—25 are located. The coil springs 25—25 are positioned beneath a keeper 26 which is larger than the cutaway opening 27 in the housing 19, heretofore referred to, and into which opening 27 the L-shaped bracket 20 moves when the trunk lid 12 is closed.

The inner body member 23 has an elevated section 28 positioned under the end 21 of the latch arm 18 and defines a second chamber therebeyond and the latch arm 18 has an offset section 29 therein with a coil spring 30 disposed in said second chamber between the said offset section 29 and the right end of the housing 19.

By referring now to Figure 3 of the drawings, the latch may be seen in unlocked position wherein the latch arm 18 has been moved outwardly of the housing 19 and the coil spring 30 compressed by such action. The latch arm 18 is held in unlocked position by the keeper 26 which is moved upwardly against the top of the housing 19 by the coil springs 25—25 so that the forward end 21 of the latch arm 18 registers against the side of the keeper 26. Such movement may obviously be imparted to the latch arm 18 by the flexible cable and sheath combination 17 which extends into the body compartment of the automobile or may alternately be provided by a solenoid (not shown) positioned adjacent the latch.

At such time as the trunk lid 12 is closed, as shown in Figure 2, the bracket 20 will strike the keeper 26, move the same downwardly against the coil springs 25 which will permit the end 21 of the latch arm 18 to be moved transversely of the L-shaped bracket 20 by the coil spring 30 and thus secure the same in locked position. The lid will remain locked until such time as the latch arm 18 is again moved away from the bracket 20.

Still referring to Figures 2, 3 and 4 of the drawings it will be seen that a secondary bottom member 31 is provided to hold the assembly in position, it being observed that the bottom 31 and the body member 23 have end extensions similar to the extensions 22 on the housing 19 which are apertured in vertical registry to permit the passage of bolts 32—32 therethrough which serve to hold the latch assembly together and to mount the same on the body member 10 of the automobile.

It will thus be seen that a simple and efficient latch has been disclosed which is particularly suited for its purpose and that it is readily operated by the mere closing of the trunk lid thereagainst and that in locked position it will securely hold the trunk lid as the end 21 of the arm 18 moves completely across the opening 27 in which the bracket 20 of the trunk lid is positioned.

It will also be observed that the trunk lid can be readily unlatched by movement imparted the latch arm 18 either by way of the flexible cable and sheath combination 17 or any other suitable means desired.

It will thus be seen that the several objects of the invention have been met by the latch for trunk lids disclosed herein.

Having thus described my invention, what I claim is:

A latch for a trunk lid comprising a housing including a flat base member and an enclosure disposed thereon, said enclosure having an apertured upper wall disposed in spaced parallel relation to said base member, a body member disposed in said housing on said base member and comprising a metal strip having two vertically spaced horizontally disposed portions joined by a vertical portion, one of said horizontally disposed portions having a U-shaped section therein and defining a first chamber below and in communication with said aperture in said upper wall of said enclosure, the other horizontally disposed portion of said body member being positioned on said base member and with said enclosure defining a second chamber, a keeper slidably disposed in said first chamber and spring means in said first chamber normally urging said keeper toward said aperture, a latch arm comprising a secondary metal strip having two vertically spaced horizontally disposed portions joined by a vertical portion and slidably disposed in said chambers with the uppermost horizontally disposed portion thereof positioned over said keeper and across the U-shaped section of said body member and adjacent said aperture, the other horizontally disposed portion of said latch arm extending into said second chamber and a coil spring in said second chamber about said latch arm normally urging said latch arm into said first chamber, a section of said latch arm extending exteriorly of said second chamber and forming means by which the latch arm may be moved, said keeper normally acting to prevent movement of said latch arm into said first chamber and across said aperture whereby said latch arm may move into said first chamber and across said aperture upon the keeper being moved inwardly of said first chamber away from said aperture.

References Cited in the file of this patent

UNITED STATES PATENTS

| | | |
|---|---|---|
| 645,049 | Fergusson | Mar. 6, 1900 |
| 1,934,105 | Totty | Nov. 7, 1933 |
| 2,293,363 | Schell | Aug. 18, 1942 |
| 2,570,390 | Schuldt | Oct. 9, 1951 |
| 2,616,739 | Allen | Nov. 4, 1952 |

FOREIGN PATENTS

| | | |
|---|---|---|
| 28,066 | Great Britain | Nov. 29, 1897 |
| 445,803 | Great Britain | Apr. 20, 1936 |